3,320,324
PROCESS FOR THE MANUFACTURE OF p-NITROSOPHENOL
Delore L. Kouba, Wilmington, Del., assignor to Hercules Incorporated, a corporation of Delaware
No Drawing. Filed Jan. 8, 1964, Ser. No. 336,346
8 Claims. (Cl. 260—621)

This invention relates to the process for the production of p-nitrosophenol by the reaction of phenol and nitrous acid.

It is well known to produce p-nitrosophenol by gradual addition of phenol to nitrous acid in aqueous solution, or by gradual addition of sodium phenoxide and sodium nitrite to sulfuric acid solution. In the former case, the high concentration of nitrous acid causes decomposition of the acid, as well as further reaction between nitrous acid and the p-nitrosophenol. In the latter case, the sulfuric acid is necessarily concentrated so as to neutralize the sodium salts introduced and such strong acid causes formation of oxides of nitrogen from the nitrous acid which oxides react with the p-nitrosophenol Side reactions of various types due to high acidity are well known.

It is also well known in the most practical commercial methods for the production of p-nitrosophenol to add nitrous acid to an aqueous suspension of phenol in water or in sodium sulfate solution or, alternatively, to acidify a mixture of sodium nitrite and sodium phenolate, which processes are equivalent with respect to the presence of a separate phenol phase during nitrosation. In these cases, where there is inherently an excess of phenol, the p-nitrosophenol dissolves therein and does not crystallize until the phenol is substantially all converted. This leads to side reactions between phenol and nitrosophenol. Moreover, in the case where a mixture of sodium phenolate is gradually acidified in the presence of sodium nitrate, the nitrosation begins while the solution is mildly acid, and in such solutions of pH 4–7 there is a great deal of tar formation by reactions between phenol and nitrosophenol.

An alternative procedure of adding the sodium phenolate and sodium nitrite solutions to the sulfuric acid, usually as a single solution, overcomes the difficulty of excess phenol, provided the reagents are added gradually, but not the difficulty due to the strong sulfuric acid which is necessarily in excess to neutralize the sodium of both reagents. The long contact of the p-nitrosophenol in this strongly acid medium, likewise, produces tars.

It has been recognized that the stability of p-nitrosophenol itself against tar formation is greater in an acid medium of pH about that of p-nitrosophenol itself, namely, about 4.5.

In a typical nitrosation proces of recent prior art, sulfuric acid is added gradually with thorough mechanical agitation to an aqueous solution of sodium nitrite and sodium phenolate. The sulfuric first liberates phenol forming a phenol phase, and the mixture remains alkaline until a substantial proportion of the phenol is liberated from the sodium phenolate. Any nitrous acid formed during the period of alkalinity is due to inefficient agitation and local concentration of the sulfuric acid added. When the pH drops below 7 to the range of about 6.5–5, nitrosation begins and continues with continued addition of sulfuric acid. The initially produced nitrosophenol dissolves in the phenol phase, and crystallization of the p-nitrosophenol is retarded thereby. The nitrosation is continued until the phenol phase, which holds back crystallization, is consumed. Filtration prior to this stage is highly impractical due to the large amount of phenol that occludes to the p-nitrosophenol. It has been recognized in this process that the alkaline character of the solution during the stage of liberating phenol should be maintained and that the pH of the final solution from which the nitroso derivative of the phenolic compound is crystallized should be about the same acidity as that of the nitroso derivative.

In spite of careful control, however, in all processes in which phenol is used in sufficient excess to dissolve the nitroso derivative, there are tars formed due to interaction of the two compounds and due also to interaction of phenol and diazo compounds produced by reaction of p-nitrosophenol with oxides of nitrogen.

It is an object of the present invention to avoid dark, tar-like by-products which reduce the yield of p-nitrosophenol and contaminate the product, particularly avoiding a free phenol phase, and to provide a process from which the p-nitrosophenol can be recovered continuously.

In accordance with this invention, sodium nitrite, phenol, and mineral acid, each in aqueous solution, are continuously brought together with rapid agitation in the chemical equivalency proportions for the formation of p-nitrosophenol of approximately 1.2:1.0:1.2 to 1.4:1.0:1.4 in an aqueous reaction medium comprising a sodium salt solution of said mineral acid of pH lower than about 5 saturated with p-nitrosophenol at a temperature in the range of about 0–15° C. at such a rate that the pH is maintained lower than about 5 and the phenol forms a single phase solution with said reaction medium, whereby a slurry of crystalline p-nitrosophenol is formed with said reaction medium from which p-nitrosophenol is continuously separable as crystals free of mother liquor and phenol.

The crystalline p-nitrosophenol is separated in any suitable manner from th mother liquor, such as by screening, or the slurry is withdrawn and the mother liquor returned at least in part to the reaction chamber. Suitably, the mother liquor is returned as necessary so as to provide for the reaction medium which is a sodium salt solution of the salt of the mineral acid used and which is saturated with p-nitrosophenol. Moreover, the amount of mother liquor returned by recycle is sufficient to maintain a suitable volume of reaction medium, and the rate of removal of crystals is such as to maintain a slurry density low enough to provide good fluidity for adequate mixing of the entering reagents. The amount of water introduced with the reagents is an amount sufficient to produce a reaction mixture of substantially the same concentration with respect to the salt of the mineral acid as the reaction medium itself. Since the salt advantageously reduces the solubility of the p-nitrosophenol, its minimum concentration should be at least about 5%, and preferably not less than 50% of saturation.

The present process thus provides for the contacting of phenol with nitrous acid in an acid medium in dilute solution with no large excess of reagents under conditions that the p-nitrosophenol crystallizes readily and is thus less subject to side reactions which cause dark, tarry by-products, and the crystalline p-nitrosophenol is readily removed continuously and the maximum yield of pure product is obtained.

Under the conditions of the process of this invention, wherein the pH is maintained at less than about 5 during the course of the reaction and the penol is added slowly so that it is present only in dilute solution and only in an aqueous phase, the nitrosation reaction is one in which the process is carried out in relatively dilute solution. This is an advantage from the standpoint of preventing both the decomposition of nitrous acid and the formation of by-products. It is particularly helpful in preventing the formation of diazonium salts which are reactive with phenols, for example.

The mineral acid may be sulfuric acid or hydrochloric acid. In carrying out the process, the initial reaction may be started in a dilute sodium salt solution of the acid to be used and acid is added first to bring the pH to the desired level. The reagents are then added in aqueous solutions at such a rate that the ratio of sodium nitrite and acid are equivalent in amount so as to maintain the pH less than about 5, suitably in the range of 1.0–4.0 and preferably 1.5–3.0 and both are added in a ratio of 1.2–1.40 and preferably about 1.35, based on phenol added. The pH may be adjusted at any time by adjustment of either the sodium nitrite rate or the acid rate. An increase of sodium nitrite or a reduction of the acid will increase the pH of the solution.

The initial addition of reagents for production of p-nitrosophenol may be made in a volume of aqueous reaction medium less than that required after a slurry is produced, and the slurry removal for separation of nitrosophenol can be started at any desired time prior to attainment of the desired operating volume of reaction medium.

It is important in the process of this invention that the pH be maintained less than about 5, and preferably in the range of 1.0 to 4.0, and most preferably in the range of 1.5 to 3.0, and that operating conditions be adjusted to meet these conditions.

The concentration of the aqueous solutions of sodium nitrite, mineral acid and phenol used in the process is based on practical considerations and solutions are used as concentrated as is practical. Sodium nitrite solutions of concentration from about 10–50%, sulfuric acid from 10–85% concentrations, or hydrochloric acid from about 15–38%, and phenol from about 85–90% concentrations can be used. The total amount of water added by these solutions and as additional water, if desired, should be balanced with that withdrawn as a purge so that a substantially constant volume of reaction medium is maintained. The concentrations of each individual reagent solution is thus not critical, since a deficiency of water in one solution can be made up by more water in another. The total amount of water is that required to produce a slurry from which part of the mother liquor can be purged in each recycle. When dilute solutions are used, the amount of mother liquor purged in the process is larger. When concentrated solutions are used, sodium salt of the mineral acid will crystallize with the product, particularly in the case of sodium sulfate. When hydrochloric acid is used, the sodium chloride in the reaction mixture can be more concentrated without any tendency to crystallize and thus it is possible to use less water in the reagents and to purge a smaller volume of mother liquor. The advantage of this is that there is less loss of dissolved product, not only because there is less liquid purged, but also because there is less p-nitrosophenol dissolved in the mother liquor. It is preferable to use concentrations of reagents which result in concentrations of sodium salt of the mineral acid used about saturated so that the salt concentration in the recycled mother liquor remains fairly constant. This does not exclude the possible use of concentrations which produce a reaction slurry in which crystals of the mineral acid salt are also formed in the slurry. While less water introduced with the reagents could, under certain conditions, reduce to zero the necessity to purge mother liquor, it is preferred to purge, since the purge also removes the by-products which would otherwise accumulate. Moreover, the amount of water introduced by way of reagents may be varied during the course of the process and additional water may also be introduced to facilitate purging at a greater rate. Water may also be introduced as a concentrated solution of salt of the mineral acid during the course of the process to facilitate purging where necessary so as to maintain a reaction medium of suitable salt concentration.

While phenol is soluble in small proportions of water up to about 12%, it is soluble only to the extent of about 2–8% in the aqueous reaction medium of this invention. Phenol containing up to about 88% phenol and sufficient water to liquefy is used as a reagent and such liquefied phenol is added at such a rate that it is all dissolved in the aqueous reaction medium and does not form a two-phase system. After the point of saturation is reached in the addition, the rate of addition thereafter is fixed at that rate at which it is used up in the reaction.

The sodium nitrite and mineral acid are added in the equivalent proportions required to produce nitrous acid and a neutral salt. An excess of mineral acid is added when necessary to lower the pH of the reaction mixture, and an excess of sodium nitrite is added when necessary to increase the pH of the reaction mixture.

The reaction to produce p-nitrosophenol is exothermic and cooling is necessary to maintain the desired temperature. This is best accomplished by cooling coils or circulating cooling medium through a reaction vessel jacket. The temperature of 0–5° C. is necessary for best results and greatest yield of p-nitrosophenol.

The nitrosation reaction is not a rapid reaction at about 0–15° C. and particularly at the low dilution limited by the low solubility of the phenol in the reaction medium and p-nitrosophenol is produced gradually. Since p-nitrosophenol has a low solubility in the reaction medium, it crystallizes out of the saturated solution of the reaction medium at about the rate produced.

The p-nitrosophenol is separated as fast as convenient so as to prevent formation of a slurry density which makes stirring difficult or inefficient. A slurry density of about 20% p-nitrosophenol is about as high as can be handled and it is preferable to remove the p-nitrosophenol slurry at such a rate that the crystalline p-nitrosophenol in suspension is less than about 15% and it may be reduced to as low as 0.1%. However, it is preferable to maintain a crystalline p-nitrosophenol density in the range of 1–5% by removing the slurry, separating p-nitrosophenol crystals and recycling the mother liquor saturated in p-nitrosophenol to the reaction at the requisite rate.

The reagents used in the process of this invention are preferably added with rapid agitation so as to obtain rapid and complete mixing. The addition may be made directly to the slurry of the reaction mixture or indirectly with the recycled mother liquor. Moreover, the sulfuric acid can be diluted with mother liquor by mixing with the recycle stream prior to introduction into the reaction mixture. This stream can be cooled separately, if desired.

During the course of reaction using sulfuric acid as the mineral acid, a typical mother liquor recycled has been found to analyze 0.03–0.1 molar phenol, 0.04% p-nitrosophenol, 0.04–0.2 molar nitrous acid and sodium sulfate 5%.

The following examples in which parts, moles, and percentages are by weight further exemplify the process of this invention.

Examples

A vessel was charged with 1600 parts water at 5° C. and solutions of 90% phenol (10 molar), 6 molar sodium nitrite, and 6 molar sulfuric acid were fed with rapid stirring into the initially charged water simultaneously, the sulfuric acid leading by an amount necessary to produce a pH of 2 and these reagents were introduced in the chemically equivalent proportions of 1.35 equivalent sulfuric acid:1.35 equivalent sodium nitrite:1.0 equivalent phenol. The rate of addition was such that the temperature of the reaction solution was maintained at about 5° C. The first crystals of p-nitrosophenol appeared in 30 minutes and the filtration of the slurry with recycle of mother liquor was begun after the first hour. The slurry at this time amounted to about 2000 parts. The process was continued under the conditions in Table 1, where the yields are also reported. Each example is a separate run which was continuous except for a nightly shutdown. Yields do not include product dissolved in the mother liquor. In each of these examples the purge was equal to the amount of liquids introduced to the reaction mixture. A reasonable rate of feed was found to be: phenol 0.35 gram moles per liter of reaction medium per hour and a reasonable rate of slurry filtration was found to be 0.1 liter per liter of slurry per hour. There is a loss of 5–10 mole percent of phenol introduced due to solubility in the mother liquor and purge liquid of phenol and p-nitrosophenol, and there is an additional loss in the same range due to by-product formation.

The crystalline p-nitrosophenol of the examples is in all cases corrected for impurities such as moisture and sodium sulfate and the yield is calculated on a 100% basis.

phenol and reaction medium free of crystalline p-nitrosophenol is separated at a rate sufficient to maintain a reaction medium of substantially constant volume.

3. The process of claim 2 in which the p-nitrosophenol is separated as a slurry of said reaction medium.

4. The process of claim 1 in which a slurry of crystalline p-nitrosophenol in the reaction medium is continuously separated the cystalline p-nitrosophenol is separated from the mother liquor and mother liquor is returned in an amount sufficient to maintain a substantially constant volume of reaction medium, the rate of separation of said slurry being that required to maintain a slurry density in the reaction medium of less than about 10% crystalline p-nitrosophenol in the reaction medium.

5. The process of claim 1 in which the pH is maintained at less than 4.

TABLE 1

| Ex. | Day | T.° C. | pH | Total Moles Feed Stream ||| Equivalent Proportion NaNO$_2$:H$_2$SO$_4$:Phenol ||| Reaction Mixture Solution Analysis ||| p-Nitrosophenol |
|     |     |        |    | NaNO$_2$ 6 Molar | H$_{12}$SO$_4$ 6 Molar | Phenol 6 Molar | | | | NaNO$_2$, Moles | p-Nitrosophenol | Phenol, Moles | Process Conversion [1] |
|---|---|---|---|---|---|---|---|---|---|---|---|---|---|
| 1 | 1 |   |     |      |      |      |      |      |     |       |       |      |    |
|   | 2 | 4 | 1.7 | 3.78 | 2.36 | 2.58 | 1.46 | 1.25 | 1.0 | 0.038 | 0.055 | 0.16 | 76 |
|   | 3 | 4 | 1.7 | 3.90 |      | 2.70 | 1.44 |      | 1.0 | 0.052 | 0.069 | 0.18 | 75 |
| 2 | 1 | 2 | 2.1 | 4.81 | 3.00 | 3.45 | 1.39 | 1.74 | 1.0 | 0.067 | 0.055 | 0.18 | 85 |
|   | 2 | 4 |     | 3.78 | 1.63 | 2.46 | 1.53 | 1.33 | 1.0 | 0.068 | 0.055 | 0.18 | 82 |
|   | 3 | 3 | 2.0 | 3.83 | 1.82 | 2.57 | 1.49 | 1.42 | 1.0 | 0.050 | 0.090 | 0.19 | 80 |
|   | 4 | 3 | 1.4 | 3.74 | 1.74 | 2.70 | 1.38 | 1.29 | 1.0 | 0.053 | 0.083 | 0.22 | 76 |
| 3 | 1 | 4 | 2.3 | 4.70 | 2.37 | 3.50 | 1.34 | 1.35 | 1.0 | 0.021 | 0.076 | 0.16 | 82 |
|   | 2 | 4 | 2.0 | 3.72 | 1.93 | 2.67 | 1.39 | 1.45 | 1.0 | 0.055 | 0.069 | 0.21 | 82 |
|   | 3 | 3 | 1.6 | 3.59 | 1.73 | 2.70 | 1.33 | 1.28 | 1.0 | 0.074 | 0.062 | 0.25 | 78 |
|   | 4 | 3 | 1.4 | 3.68 | 1.69 | 2.69 | 1.37 | 1.25 | 1.0 | 0.059 | 0.076 | 0.24 | 76 |
| 4 | 1 | 3 | 2.1 | 4.71 | 2.61 | 3.50 | 1.35 | 1.80 | 1.0 | 0.065 | 0.069 | 0.19 | 78 |
|   | 2 | 3 | 1.6 | 3.70 | 1.81 | 2.69 | 1.37 | 2.04 | 1.0 | 0.074 | 0.076 | 0.21 | 83 |
|   | 3 | 4 | 1.9 | 3.69 | 1.80 | 2.73 | 1.35 | 2.04 | 1.0 | 0.073 | 0.069 | 0.14 | 72 |
|   | 4 | 4 | 2.1 | 3.69 | 1.80 | 2.59 | 1.40 | 2.02 | 1.0 | 0.10  | 0.077 | 0.15 | 83 |
| 5 | 1 | 4 | 1.9 | 4.47 | 2.47 | 3.22 | 1.39 | 1.81 | 1.0 | 0.077 | 0.049 | 0.14 | 73 |
|   | 2 | 2 |     | 3.55 | 1.66 | 2.58 | 1.37 | 2.14 | 1.0 | 0.062 | 0.076 | 0.22 | 80 |
|   | 3 | 3 | 1.8 | 3.65 | 2.01 | 2.51 | 1.45 | 1.82 | 1.0 | 0.074 | 0.076 | 0.15 | 74 |
|   | 4 | 3 | 2.6 | 3.55 | 2.16 | 2.52 | 1.41 | 1.64 | 1.0 | 0.078 | 0.069 | 0.15 | 75 |

[1] Moles isolated product per mole of phenol fed, yield based on content of pure p-nitrosophenol.

What I claim and desire to protect by Letters Patent is:

1. The process of producing p-nitrosophenol which comprises bringing together continuously and simultaneously with rapid agitation aqueous solutions of sodium nitrite, phenol, and a mineral acid of the group consisting of sulfuric acid and hydrochloric acid, as reagents in the chemically equivalency proportions for the production of p-nitrosophenol of about 1.2:1.0:1.2 to 1.4:1.0:1.4, in a reaction medium comprising essentially an aqueous sodium salt solution of said mineral acid and saturated with p-nitrosophenol at a pH lower than 5 and a temperature in the range of about 0–15° C., at such a rate that the pH is maintained below 5 and phenol dissolves completely in the aqueous phase without formation of a phenol phase, whereby a slurry of crystalline p-nitrosophenol is formed with said reaction medium, and separating said crystalline p-nitrosophenol substantially free of mother liquor from said reaction medium, the amount of water introduced with said reagents being substantially the amount required for producing a reaction mixture of substantially the same concentration with respect to the salt of said mineral acid as the reaction medium itself.

2. The process of claim 1 in which the p-nitrosophenol is continuously separated at such a rate that the slurry density is maintained at less than about 10% p-nitroso- 6. The process of claim 1 in which the pH is maintained in the range of 1.5–3.0.

7. The process of claim 1 in which the aqueous mineral acid solution has a concentration in the range of 10–85%, the sodium nitrite solution has a concentration in the range of 10–50% and the aqueous phenol solution has a concentration in the range of 85–90%.

8. The process of claim 1 in which the mineral acid is sulfuric acid of about 44% concentration, the sodium nitrite solution has a concentration of about 35% and the phenol has a concentration of about 85–88%.

References Cited by the Examiner

UNITED STATES PATENTS 2,225,357  12/1940  Teter _____ 260—621
2,234,692  3/1941  Donovan et al. _____ 260—621

OTHER REFERENCES

Toshiro Suzawa et al.: Science & Industry (Japan), vol. 29 (1955), pp. 7–9.

LEON ZITVER, *Primary Examiner.*

D. M. HELFER, H. ROBERTS, *Assistant Examiners.*